United States Patent [19]

Gutjahr

[11] Patent Number: 4,592,714
[45] Date of Patent: Jun. 3, 1986

[54] MOLD CLOSING UNIT OF AN INJECTION MOLDING MACHINE

[75] Inventor: Lothar Gutjahr, Denzlingen, Fed. Rep. of Germany

[73] Assignee: Klöckner-Werke Aktiengesellschaft, Duisburg, Fed. Rep. of Germany

[21] Appl. No.: 636,723

[22] Filed: Aug. 1, 1984

[30] Foreign Application Priority Data

Aug. 3, 1983 [DE] Fed. Rep. of Germany ....... 3327937

[51] Int. Cl.⁴ .............................................. B29C 45/68
[52] U.S. Cl. .................................... 425/150; 264/40.5; 425/451.2; 425/590; 425/DIG. 223
[58] Field of Search .................. 425/150, 451.1, 145, 425/451.2, 451.3, 451.5, 451.7, 589, 590, 592, DIG. 223, 135, 149; 264/40.5; 91/35, 380

[56] References Cited

U.S. PATENT DOCUMENTS

| | | | |
|---|---|---|---|
| 3,564,659 | 2/1971 | Koch et al. | 425/149 |
| 3,642,405 | 2/1972 | Eggenberger et al. | 425/154 |
| 3,677,685 | 7/1972 | Aoki | 425/451.2 |
| 3,704,973 | 12/1972 | Renfrew et al. | 425/154 |
| 3,797,364 | 3/1974 | Schulze | 91/35 |
| 3,825,235 | 7/1974 | Schwertfeger et al. | 425/145 |
| 3,857,658 | 12/1974 | Muzsnay | 425/145 |
| 3,940,930 | 3/1976 | Rosander | 425/450.1 |
| 3,941,534 | 3/1976 | Hunkar | 425/145 |
| 4,009,983 | 3/1977 | Jacobs | 425/451.2 |
| 4,253,358 | 3/1981 | Schulze | 82/5 |
| 4,473,345 | 9/1984 | McDowall | 425/154 |
| 4,540,359 | 9/1985 | Yamazaki | 425/135 |

FOREIGN PATENT DOCUMENTS

| | | | |
|---|---|---|---|
| 2112701 | 9/1972 | Fed. Rep. of Germany | 425/451.2 |
| 3031499 | 2/1982 | Fed. Rep. of Germany | 425/154 |
| 3032407 | 3/1982 | Fed. Rep. of Germany | . |
| 56-99644 | 8/1981 | Japan | . |

OTHER PUBLICATIONS

Berger Lahr, entitled "DIVI-STEP Type SST 088/SST 093".
Hartmann and Laemmle KG, "Electro-Hydraulic Linear Amplifier LVS", 10th Edition 1977.

Primary Examiner—Jay H. Woo
Assistant Examiner—J. Fortenberry
Attorney, Agent, or Firm—Watson, Cole, Grindle & Watson

[57] ABSTRACT

A mold closing unit of an injection molding machine has a threaded spindle which is engaged with the movable mold clamping plate of the machine via a spindle nut. The spindle is attached to the stationary mold clamping plate of the machine in a freely pivotable manner, and is connected with a stepping motor by means of a coupling. The stepping motor is controlled depending on a specified speed pattern as a function of the distance between the mold halves of the mold clamping plates. The valve body of a 4/2-way valve engages the spindle for relative axial movement and controls the hydraulic operating medium for the mold closing unit. A switch is arranged in the casing of the valve which can be triggered by the coupling and which actuates, for example, an indication system when a mold closure security error occurs.

1 Claim, 2 Drawing Figures

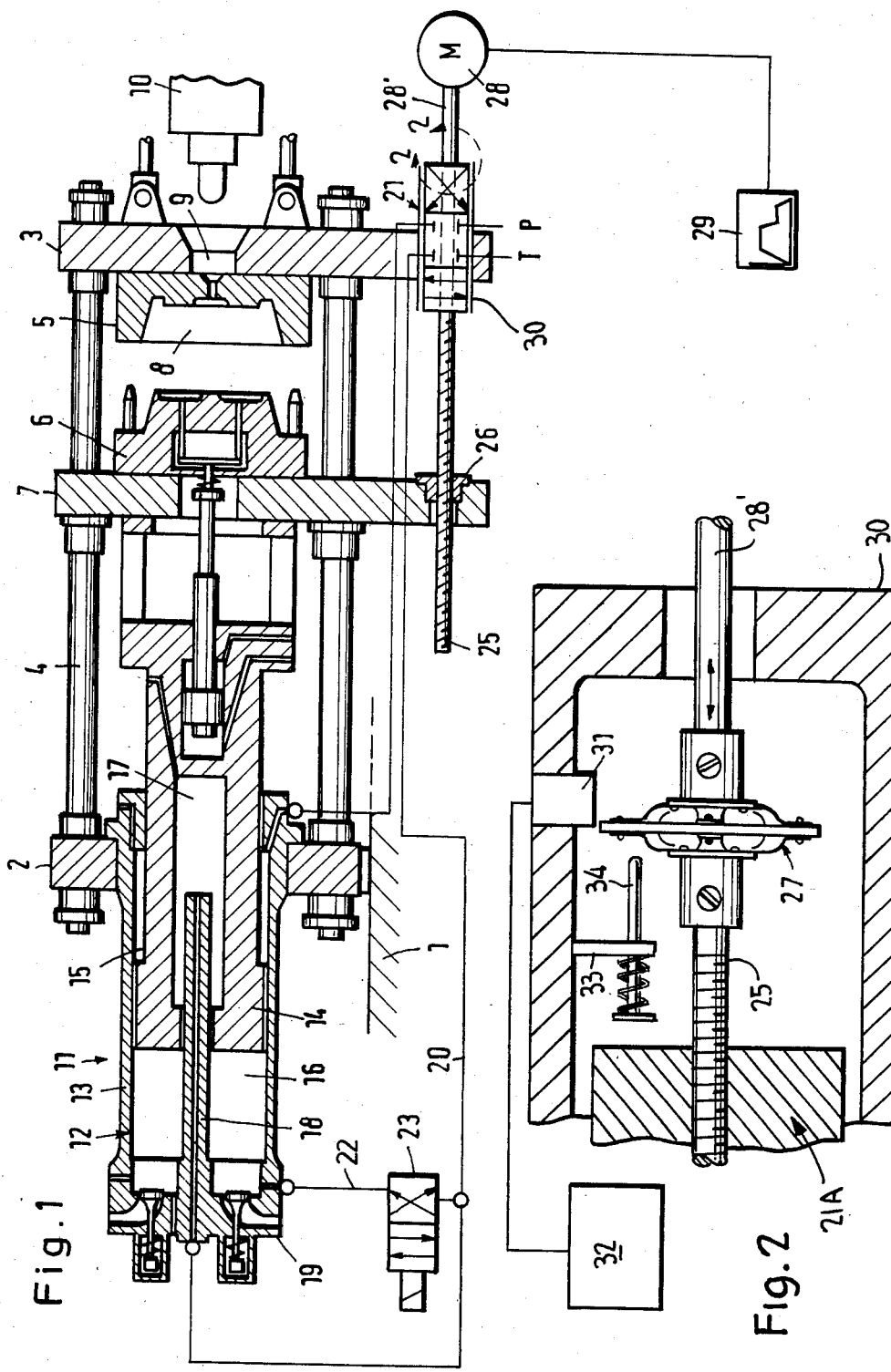

MOLD CLOSING UNIT OF AN INJECTION MOLDING MACHINE

RELATED APPLICATIONS

This application relates to U.S. Ser. No. 463,112, filed Feb. 2, 1983, and further to U.S. Ser. Nos. 636,717 and 636,722, filed concurrently herewith and based on West German application Nos. P 33 27 935.7-16 and P 33 27 936.5-16, both filed Aug. 3, 1983.

BACKGROUND OF THE INVENTION

This invention relates to a mold closing unit of an injection molding machine which includes a stationary mold clamping plate and a movable mold clamping plate slidable along parallel guide rods relative to the stationary mold plate, a movable mold affixed to the movable plate, a mating fixed mold die affixed to the stationary plate, and the unit comprising a fixed, hydraulic mold closure retention cylinder, and a hydraulic traveling cylinder including a piston operable within the retention cylinder and being connected with the movable die.

In known injection molding machines, the injection cycle is effected in such a manner that, while the mold is closed, plastic material is injected into the mold cavity formed by the two halves of the mold, the mold is opened, the plastic molded element is ejected with the opening of the mold and the mold is again closed for the production of another plastic molded element. The closing of the mold is effected from a distance corresponding to the maximum distance between the mold clamping plates in such a manner that the movable mold clamping plate is initially accelerated to the maximum speed and then is decelerated when a specified distance is reached from the stationary mold clamping plate depending on the height or thickness of the clamped injection mold so that the mold is closed below the creep rate. Subsequently, the mold closure retention cylinder is hydraulically acted upon to effect the required mold closure retention force (closing force).

The ejection of the plastic molded element is effected during the opening process. However, the plastic molded element sometimes remains stuck to or in one-half of the mold and thereby blocks the closing of the mold. Since the closing of the mold takes place under a reduced hydraulic pressure in its final phase in order to protect the mold cavity against damage, the movable mold clamping plate with the movable die mold clamped thereto remains in a position blocked by the plastic molded element. In order to sense such an error, which is referred to herein as a mold closure security error, a minimum time interval was formerly specified within which the closing position of the mold was to be achieved in the final phase. Thus, as this time interval was exceeded, a malfunction signal was emitted as an indication of a mold closure error. It can be seen that, however, with a closing of the mold below the creep rate, i.e. with a reduced hydraulic pressure, a malfunction indication can also be effected when, for example, the lubrication on the guide rails of the molding machine deteriorates such that the movable mold clamping plate is caused to stick due to increased friction. Also, a bent guide rail can trigger such an error indication. Thus, factors other than a mold closure security error can trigger an error indication. Moreover, it is difficult to indicate mold security errors in a time-dependent fashion such as, for example, when a longer mold closure security path is specified for a simultaneous extension of the height of the mold when changing molds, such that this longer mold closure security path will result in the specification of a longer minimum time for the closing of the mold in the final phase.

SUMMARY OF THE INVENTION

It is therefore an object of the present invention to provide a mold closing unit of an injection molding machine in such a manner that a sensing and indication of mold closure security errors is independent of time and clearly provides a mold closure security system avoiding the aforementioned drawbacks.

This general objective is achieve according to the invention in that a threaded spindle engages the movable mold clamping plate via a spindle nut, is freely rotatable in the stationary mold clamping plate and is connected with a stepping motor through a coupling, the valve body of a 4/2-way valve being arranged on the spindle for relative axial movement therewith, the stepping motor being controllable dependent on a specified speed and/or pressure pattern as a function of the distance between the mold halves or the mold clamping plates, and a switch of a switch-off or switch-over or indication system is arranged in the valve casing of the 4/2-way valve and is actuated by the coupling when a mold closure security error arises. With such an arrangement, a clear indication of mold closure security errors is provided which automatically takes into account any possible changes in the height of the mold. moreover, according to the invention, the stepping motor is controlled dependent on a specified speed and/or pressure pattern as a function of the distance between the mold halves or the mold clamping plates. thus, the stepping motor rotates the spindle such that the valve body of the 4/2-way valve is simultaneously moved and opens an effectively sizeable cross-section for the passage of the hydraulic operating medium to the traveling cylinder and to the mold closure retention cylinder in the corresponding phase of movements. At the same time, a corresponding oppositely directed movement is effected for the valve body on the spindle which is counteracted again by the stepping motor in accordance with the specified pressure and/or speed pattern. In the event of a mold closure security error, the controlled stepping motor will continue rotating to move the movable mold clamping plate into the closing position of the mold in accordance with the specified pattern. But, at the same time, the multi-way valve enlarges the cross-section for the hydraulic operating medium owing to non-effected or reduced traveling movement in comparison with the specified number of steps of revolution for the positioning of the movable mold clamping plate which thus causes the axially movable valve body to move against a mechanical stop in the valve casing. It is essential that this is effected at a constant hydraulic pressure, i.e. no control command is to be given to the mold closing unit to close the mold with increased hyraulic pressure. When moving against the mechanical stop, the valve body shifts a maximum axial distance which causes the coupling arranged between the spindle and the stepping motor to likewise shift a maximum axial amount which does not otherwise occur in a properly functioning operation, so as to activate the switch arranged in the valve casing in the presence of a mold closure security error. The output signal produces a reversal in direction for the closing unit or a switch-off, or a switch-over or indication direction within a display for the mold closure security error. The switch arranged in the valve casing is preferably a known, non-contact electronic switch which operates, for example, in accordance with the principles of a Hall generator.

Thus, the principle of a hydraulically back-coupled rigid control circuit is utilized in carrying out the invention. Hydraulic components operating in accordance with this principle of a hydraulically rigid back-coupling are disclosed in the publication by Hartmann and Lemmle KG, entitled "Electro-Hydraulic Linear Amplifier LVS," edition 10th 1977. Such components have only been herefore used, for example, to exactly position machine parts which are movable on machine tools. However, those skilled in the art have never considered integrating this principle into mold closing units of injection molding machines and, in particular, providing a mold closure security system according to this principle.

BRIEF DESCRIPTION OF THE DRAWING

FIG. 1 is a longitudinal sectional view of an injection molding machine incorporating the mold closing unit according to the invention; and FIG. 2 is an enlarged, detail view taken at arrow 2.

DETAILED DESCRIPTION OF THE INVENTION

The injection molding machine with which the mold closing unit of the invention is associated includes a support bed 1 on which a pair of spaced, parallel support plates 2 and 3 are fixedly mounted and are interconnected by a plurality of guide rods 4 lying parallel to the central axis of the plates. Support plate 3 defines a stationary mold clamping plate on which one-half 5 of a divided injection mold is clamped while the other half 6 of the mold is clamped on a movable mold clamping plate 7 mounted on the guide rods for sliding movement therealong. In the closed position, the two mold halves enclose a mold nest or cavity 8 in a known manner into which plastic material is injected through a sprue hole 9 by the provision of an injection unit 10. A mold closing unit, generally designated 11, extends from one side of the movable mold clamping unit. The closing unit comprises a traveling cylinder, generally designated 12, having a cylinder 13 affixed at its inner end to support plate 2. Piston 14 operating within cylinder 13 is acted upon on opposite sides upon pressure fluctuations within pressure chambers 15 and 16. The piston rod of piston 14 is connected with the movable mold clamping plate. And, the piston is hollow so as to define a pressure chamber 17 into which a hollow tube 18 extends in a telescoping manner. This hollow tube is rigidly connected to a front plate 19 of cylinder 13, and has a connection for a hydraulic pressure line 20 which is connected with a 4/2-way valve 21 through which a hydraulic operating medium can be supplied and discharged. The piston 14, its piston rod and tube 18 form the traveling cylinder. A branch line 22 is formed in the supply line between the connection of the traveling cylinder and the 4/2-way valve, and another multi-way valve 23 is connected with pressure chamber 16 and is arranged in branch line 22.

An elongated, threaded rotatable spindle 25 engages the movable mold clamping plate and extends through a spindle nut 26 affixed to plate 7. The spindle extends through the stationary mold clamping plate and the casing of the 4/2-way valve in a freely rotatable manner, and is coupled with a shaft 28' of a controlled stepping motor 28 by means of a spring coupling 27 (FIG. 2). The valve body of multi-way valve 21 is arranged on spindle 26 for axial movement upon rotation thereof. Stepping motor 28 is controlled in accordance with a specified program depending on the speed of the movable mold clamping plate. The values are stored as a function of the path covered by the movable mold clamping plate, and is schematically illustrated by memory 29. With the closing of the mold and after the movable mold clamping plate has reached a specified distance from the stationary mold clamping plate, for example, the number of steps of revolution of the stepping motor is increased by means of an output signal of the memory whereby the closing speed is automatically reduced to the creep rate.

In FIG. 2, a non-contact approximation switch 31 is shown in casing 30 of 4/2-way valve 21, the magnetic field of which is acted upon by a corresponding movement of spring coupling 27 (toward the right shown in FIG. 2) in such a manner that it transmits an output signal to system 32 which either cuts out the hydraulic control of the injection molding machine or indicates the mold closure security error on a display screen. After the switch-over to the creep rate, the movable mold moves into the position "Mold Closed". If, for example, there is a molded element between the halves of the mold which has not been properly ejected, the movable mold clamping plate stops at the corresponding point owing to the low hydraulic forces. The result is that the 4/2-way valve increases the cross-section for the passage of the hydraulic operating medium whereby the valve body is moved to its maximum axial extent against a mechanical stop such as 34 mounted on a bracket 33 within casing 30, the stop being spring-biased toward the left shown in this Figure. Thus, as mechanical stop 34 is shifted toward the right upon a maximum axial movement of the valve body of the valve 21, it impacts against coupling 27 and likewise causes it to shift to the right to its maximum axial extent, so that the switch responds and emits a malfunction signal as a mold closure security error. Of course, any other equivalent mechanical stop arrangement can be provided for carrying out the invention.

Obviously, other modifications and variations of the invention are made possible in the light of the above teachings. It is therefore to be understood that within the scope of the appended claims the invention may be practiced otherwise than as specifically described.

What is claimed is:

1. A mold closing unit of an injection molding machine which includes a stationary mold clamping plate and a movable mold clamping plate slidable along parallel guide rods relative to said stationary plate, a movable mold die affixed to said movable plate, a mating fixed mold die affixed to said stationary plate, the unit comprising a fixed, hydraulic mold closure retention cylinder, and a hydraulic traveling cylinder including a piston operable within said retention cylinder and being connected with said movable die, means for operating said unit comprising a hydraulic supply passage leading to said traveling cylinder and to said retention cylinder for operating said piston, a linear amplifier having hydraulically fixed feedback and comprising a 4/2-way valve arranged in said supply passage for axial movement to control the flow of hydraulic fluid through said passage for closing and opening said movable die, an elongated threaded rotatable spindle extending between said mold clamping plates, a spindle nut on said movable plate through which said spindle extends, a stepping motor connected via a spring coupling with said spindle for rotation thereof, said valve having a valve body on said spindle for axial movement upon spindle rotation, and said valve having a valve casing surrounding said valve body, said stepping motor being controllable depending on one of a specified speed and pressure pattern as a function of the distance between said movable and fixed or between said mold clamping plates, a stop located in said valve housing at a predetermined axial distance from said valve body, whereby rotation of said spindle effects the movement of said valve body to control the flow of hydraulic fluid, the movement of said movable die effecting an oppositely directed movement of said valve body via said spindle which is counteracted by said motor, and a control or indicator switch arranged in said valve casing at said predetermined axial distance from said coupling, said valve body reacting to a mold closure security error condition, which impedes the closing of the mold, by being shifted a maximum axial distance equal to said predetermined distance against said stop, the shifting of said valve body causing said coupling to shift said maximum distance for activating said switch to control or indicate said condition.

* * * * *